United States Patent

Shin et al.

[11] 4,037,261
[45] July 19, 1977

[54] TAPE RECORDER WITH HEAD POSITIONING MECHANISM

[76] Inventors: Masami Shin, Mubanchi Kurojinishi Nakagawa-cho, Nakagun, Tokushima; Kanji Tamaki, 32 Nakagawahara Yokomi-cho, Anan, Tokushima, both of Japan

[21] Appl. No.: 571,951

[22] Filed: Apr. 28, 1975

[30] Foreign Application Priority Data

May 3, 1974    Japan .................. 49-62120

[51] Int. Cl.² .............. G11B 5/54; G11B 21/08; G11B 23/18
[52] U.S. Cl. ........................ 360/78; 360/93; 360/106
[58] Field of Search .............. 360/78, 106, 93, 94, 360/85, 75, 132

[56] References Cited

U.S. PATENT DOCUMENTS

| | | | |
|---|---|---|---|
| 3,538,779 | 11/1970 | Yamamoto | 360/106 |
| 3,800,320 | 3/1974 | Murakmmi | 360/93 |
| 3,839,732 | 10/1974 | Backmann | 360/78 |
| 3,877,071 | 4/1975 | Matsuzaki | 360/78 |
| 3,879,759 | 4/1975 | Matsui et al. | 360/106 |
| B 350,589 | 1/1975 | Tozawa | 360/78 |

*Primary Examiner*—Alfred H. Eddleman

[57] ABSTRACT

The present invention relates to a tape recorder which is attached with an endless magnetic cartridge having 8 track-4 channels or 4 track-2 channels wherein each channel may be recorded or regenerated one after another.

2 Claims, 21 Drawing Figures

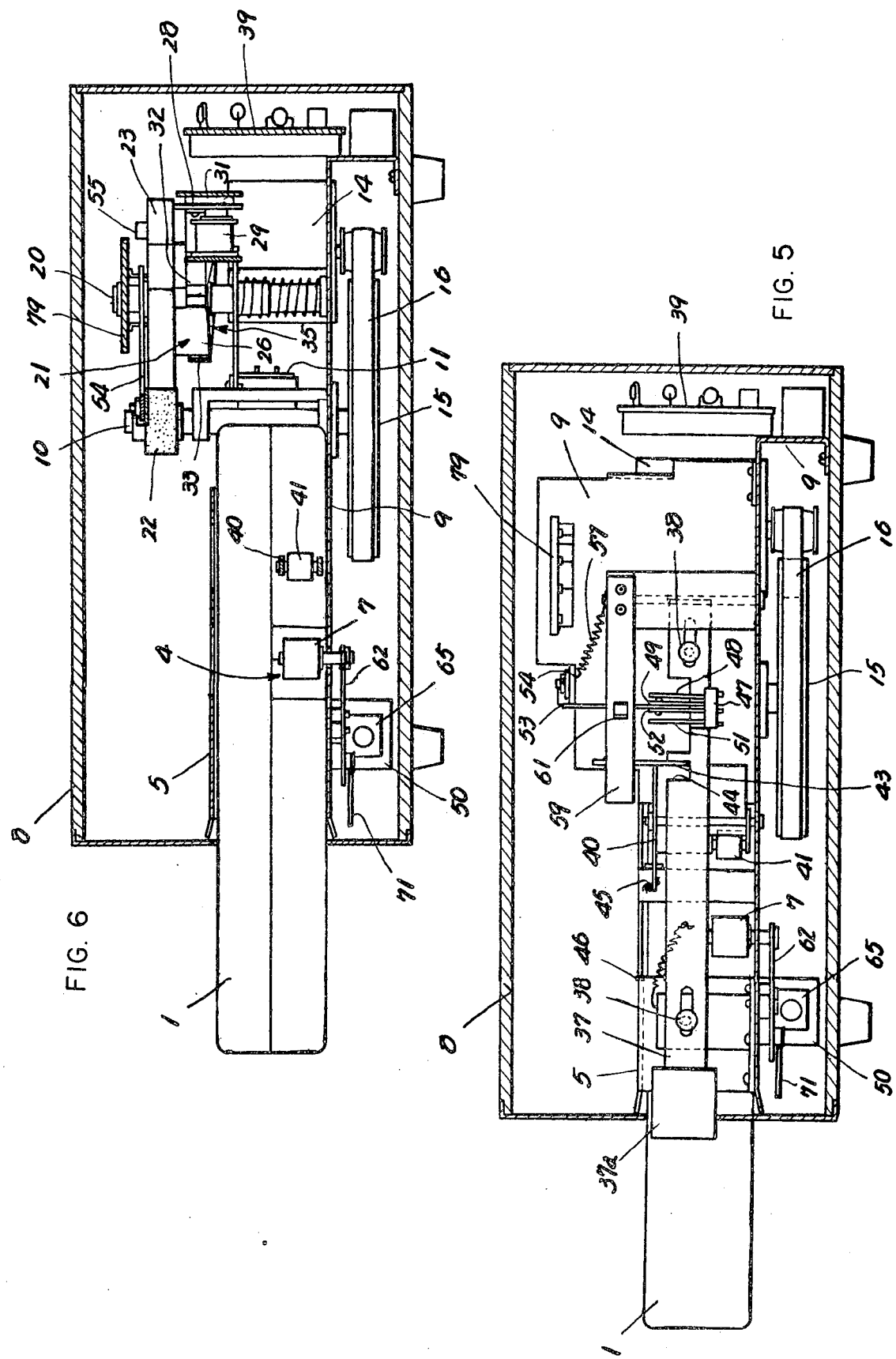

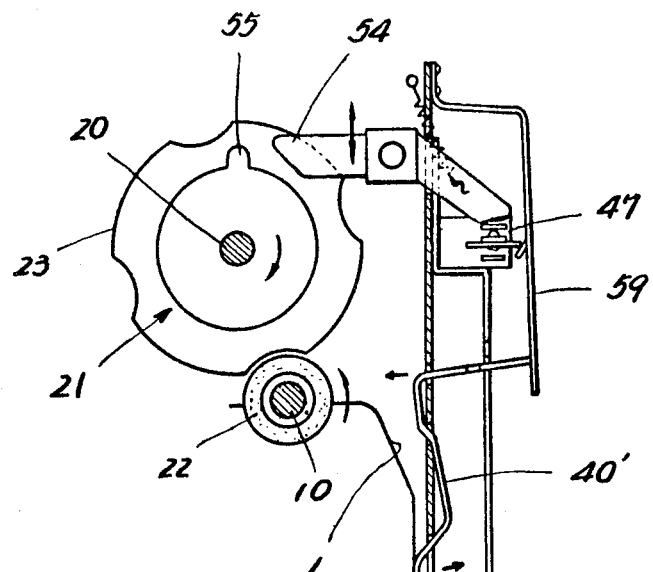
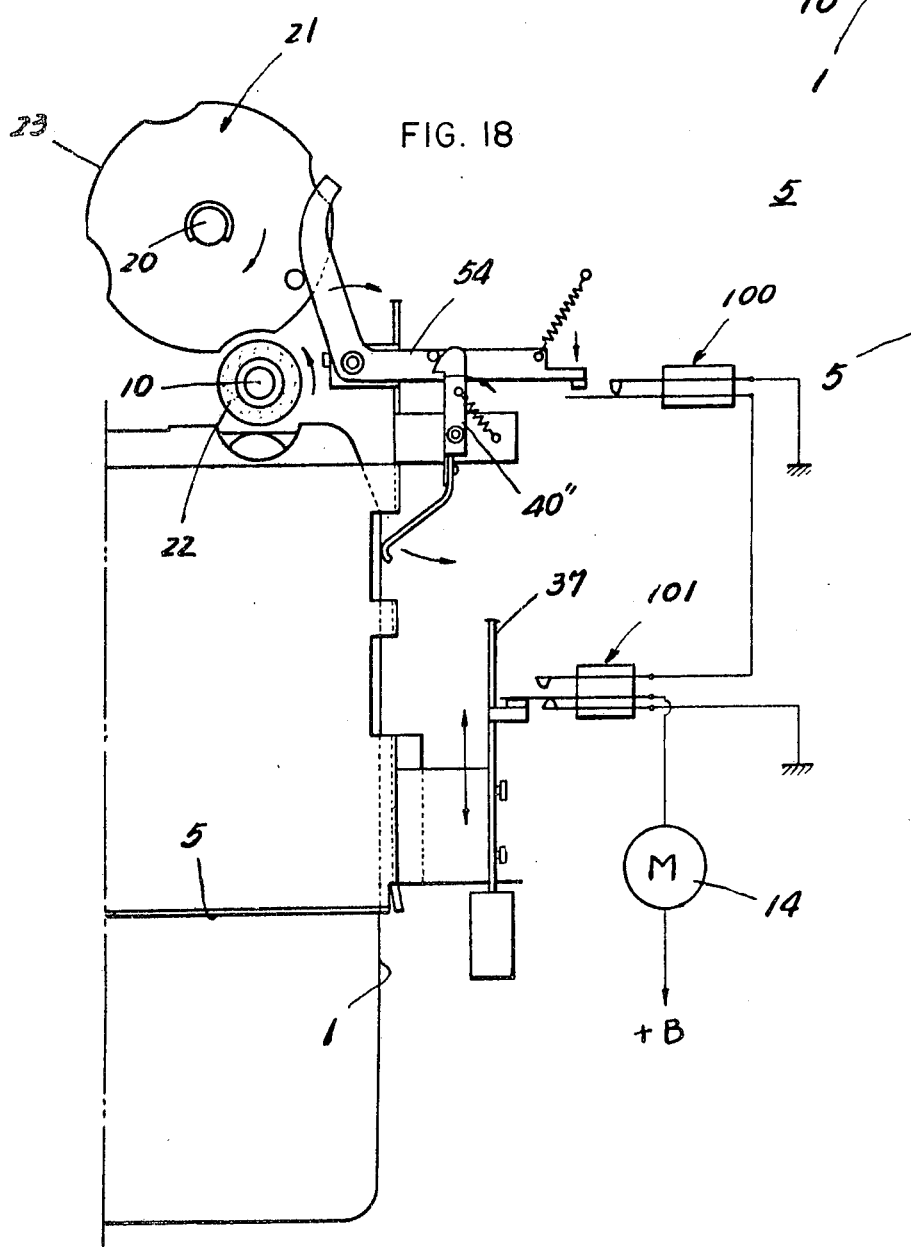
FIG 17
FIG. 18

TAPE RECORDER WITH HEAD POSITIONING MECHANISM

The tape recorder comprising a case for accommodating a magnetic tape cartridge in a playable condition which has a plurality of channels; a flexible roll linked to a capstan shaft for forwarding the magnetic tape at a uniform speed; and a rotary body having a first, a second cam and a channel switch cam, said first cam adjoining to the flexible roll to transfer torgue of the capstan, said second cam locating the first cam and adjoining the first cam to the flexible roll, the channel switch cam switching adjoining position of the magnetic head to the magnetic tape wherein the torgue of the capstan shaft is transferred to the rotary body through the flexible roll thereby achieving channel switch operations of the magnetic head.

The present invention relates to a tape recorder which is attached with an endless magnetic cartridge having 8 track-4 channels or 4 track-2 channels wherein each channel may be recorded or regenerated one after another.

It is an object of the present invention to provide a new and improved tape recorder wherein a rotary body integrally formed together with a plurality of cams achieves channel switching of the magnetic tape, drive switching and switching operations whereby driving power for the magnetic tape can be utilized to switch the channels.

It is another object of the present invention to provide a novel tape recorder which is simple in the constructor and can be assembled in a compact unit.

Another object of the present invention is to provide such a tape recorder in which a channel switch operation of the tape is achieved by co-working of a flexible roll and the rotary body whereby operations of the mechanism are performed instantly and without errors.

Other objects and advantages of the present invention will appear from the following detailed description of certain preferred embodiments of the invention.

In the accompanying drawings illustrating such embodiments:

FIG. 5 is a sectional view taken on line III—III of FIG. 1;

FIG. 6 is a sectional view taken on line IV—IV of FIG. 1;

FIG. 17 is a diagrammatic view illustrating the operation of the mechanism;

FIG. 18 is a schematic view showing a switch element in another embodiment;

Figure 1:
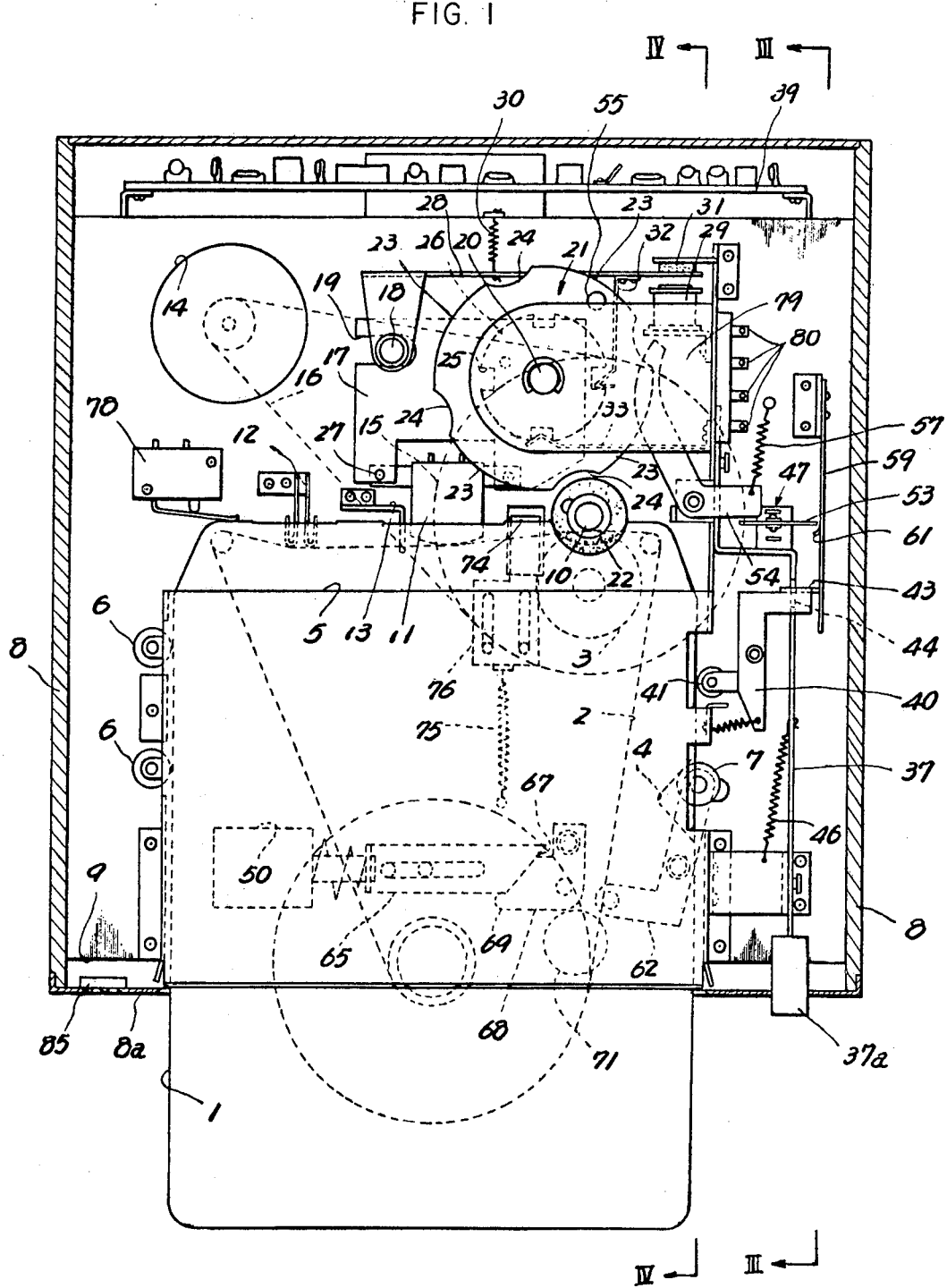
FIG. 1 is a top plan view illustrating a typical tape recorder according to the present invention.

Referring to FIG. 1, the cartridge designated 1 accommodates a magnetic tape 2 of 8 channel- 4 track type and a pinch roll 3. A V-shaped notch 4 is formed on a side portion the cartridge 1. Adopted to accommodate the cartridge 1 in a playable condition is a case 5 which on one side is provided with guide rolls 6, 6 in order to lead a side portion of the cartridge 1 to fit to the case 5. The case 5 is also provided with the pressure roll 7, on the opposite side of the guide rolls 6, 6 which is adopted to be secured in the V-shaped notch 4 under pressure.

Referring to FIGS. 1, 2, 3, and 4, a box-shaped cabinet 8 contains a chassis which is adopted to secure the case 5 therein. Designate 10 is a capstan shaft which is adopted forward the tape 2 at a regular speed under pressure together with the pinch roll 3. A magnetic head 11 is adjoining to the tape 2 and transfers input of recording or output of regeneration. A sensor 12 is mounted to detect the conductor tape (not shown) which is adjoining to each terminal end of the channels of the tape 2 in order to detect each terminal end of the channel. A tape guide 13 is adopted to forward the tape at a suitable speed on to the said head 11. A motor 14 is linked to drive the shaft 10 through the fly-wheel which is fixed to a lower end of the capstan shaft 10, and the endless flat belt 16. A base plate 17 securely supports the head 11 through an adjusting screw 27 for adjusting an inclination of the head 11. A guide pole 18 is vertically fixed at the lower end portion thereof the chassis 9 and also the middle portion of the guide pole 18 is inserted slidably into a groove 19 of a base plate 17 thereby preventing a movement of the base plate 7 in a horizontal direction. A supporting pole 20 is vertically fixed at the lower portion thereof on the chassis 9 and the middle portion thereof supports the base plate 17 slidably in a vertical direction.

A rotary body 21 pivoted on pole 20 has a first circular cam 23 which is provided with the circular-arc-shaped grooves 24 displaced every 90 degree angle along the circumference of the cam 23. A circular-arc-shaped groove 24 has a function of keeping a distance from the flexible roll 22 which is secured on the capstan shaft. The rotary body 21 has a second circular cam plate 26 which is smaller in the diameter than the first cam and provided with U-shaped notches 25 in every right angled displacement.

An absorption plate 28 has two ends, one of which is pivoted on a guide pole 18 and the other end of which is extended to a position of adjoining to an electromagnetic element 29 that is connected to sensor 12. A spring 30 is adopted to keep the absorption plate 28 apart from the electromagnetic element 29. A stopper 31 is adopted to keep the absorption plate thereagainst. A press plate 32 made of spring plate is fixed to the absorption plage 28 on one end thereof and the other end of the plate 32 has the hook 32a which engages with the notch 25 of the second cam 26. A locating plate made of spring plate is fixed to the chassis 9 on one end thereof and is inserted in the notch 25 of the second cam 26 on the other V-shaped end 33 thereof.

Figure 2:
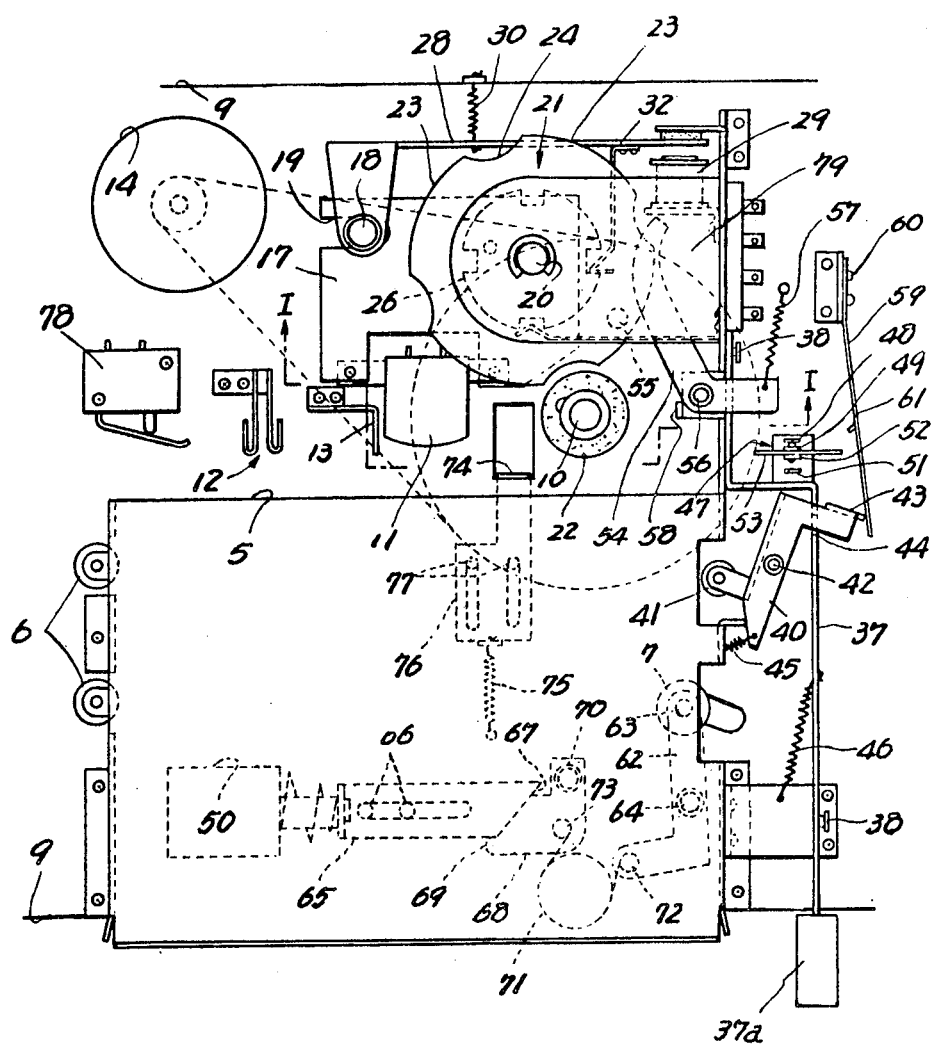
FIG. 2 is a schematic view illustrating a tape recorder from which a cartridge has been ejected.
Figure 12:
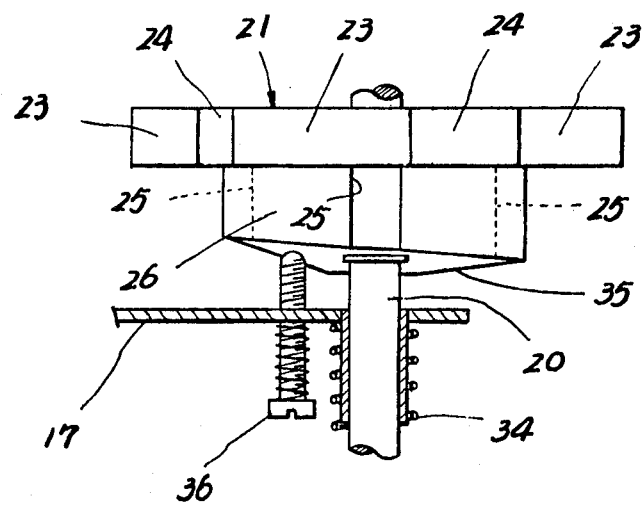
FIG. 12 is a perspective view of the cam portion.

Referring to FIGS. 1, 2, and 12, a compressed spring 34 is attached to the pole 20 between the base plate 17 and the chassis 9. A channel switch cam 35 is formed on the lower surface of the rotary body 21 so that a distance between the plate 17 and the cam 35 can be kept to a suitable position through a height adjustment screw 36.

Referring to FIGS. 1, 2, 5, and 6, the recording lever 37 is mounted slidable on the chassis through pins 38, 38 to connect a recording circuit (not shown) constructed on a wiring plate 39 onto the head 11. The lock plate 40 in the case 5 has a roll 41 on one end which is adjoining to one side of the cartridge 1. The middle portion of the plate 40 is pivoted on the chassis 9 wherein the other end portion is mounted with a joint piece 43 so that the joint piece 43 supports the level 37 through the insertion of the cartridge 1 into the groove 44 of the lever 37. The spring 45 taken the joint piece 43 away from the groove 44. The spring 46 bring back the lever 37 to the position a switch 47 fixed on the lever 37 comprises the switch parts 48, 49 which are built in a power circuit (not shown) of the motor 14 to be ON condition when it is not in an operation, the switch parts 51, 52 which are built in the power circuit (not shown) of a solenoid 50 for controlling injection to be OFF condition when it is not an operation and the adjoining plate 53 which fixes every switch 49, 52 thereon in a body. A swing plate 54 extends one end thereof so that the end locates in adjacent to a pin 55 extruded on the rotary body 21 and is operated in a right angled direction to the direction of the rotation of the pin 55. The middle portion of the swing plate 54 is swingably pivoted on the chassis 9 and the other end extends to a position to press the adjoining plate 58. A spring 57 secures the plate 54 together with the stopper 58 against the pin 55. A hook plate 59 made of spring plate is fixed on the chassis 9 at one end portion 60 thereof has a hook 61 on the middle portion thereof to keep the adjoining plate 53 in an engagement and also has the other end which is adjacent to the engagement piece 43 of the lock plate 40.

Figure 8:
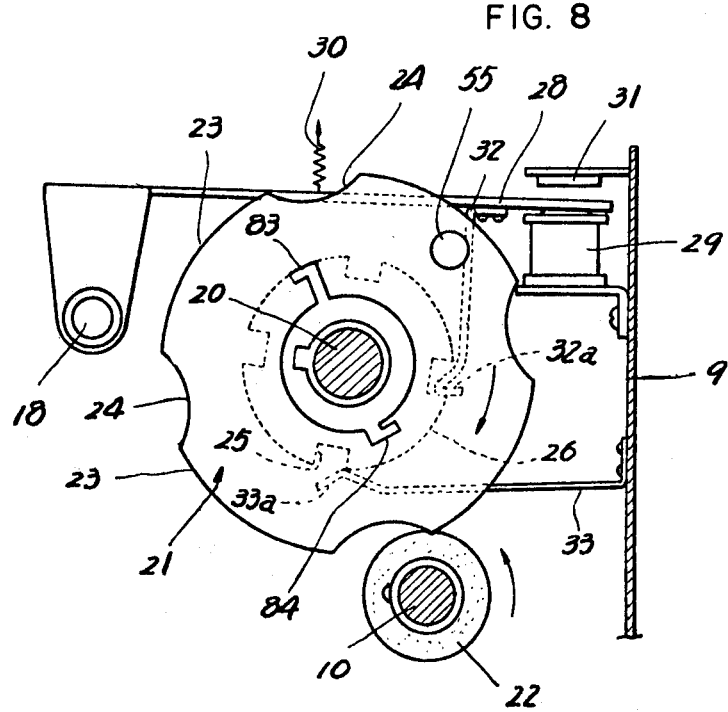
FIG. 8 is a diagrammatic view taken on line V—V illustrating the operation of the mechanism.

Referring to FIG. 1, in case recording is achieved by inserting the cartridge in the case 5 to press and slide the lever 37, the pin 55 is so constructed that when each of the first, second, third and fourth channel of the tape 2 are recorded, the pin 55 may touch the switch 47 to convert the channel. The, as shown in FIGS. 1, 2 and 8, an arm 62 has an end on which a press roll 7 is pivoted through a shaft 63. The middle portion 64 of the arm 62 is pivotedly supported on the chassis 9. A slide arm 65 is linked to the above-mentioned solenoid 50 for controlling injection on one end and the middle portion thereof is attached slidably on the chassis 9 through pins 66. The other end portion of the arm 65 is formed in a tapered surface 67. A stopper arm 68 adjacent to the arm 65 on the side thereof has an injected portion 69 which can rotate on the tapered surface 67 and is pivoted rotatably on the chassis 9 at the spot 70. A scissors-shaped spring 71 is installed between the arm 62, 68 through the pin 72, 73 to give a suitable pressure onto the cartridge 1. A cartridge ejection plate 76 has the middle portion slidably supported on the chassis through pins 77, one end portion provided with a projected surface 74 which is extended onto the chassis 9 to touch the front portion of the cartridge 1 and the other end portion attached with a compressed spring 75.

When engagements of each of the arms 65, 68 are cancelled by the solenoid 50, the injected portion 69 slides along the tapered surface 67 so that the pressure of the press roll 7 due to the spring 71 may drop down to zero and the pressure due to the spring 75 may reverse the injection plate 76 thereby push the cartridge 1 outward from the case 5.

Further referring to FIGS. 1 and 2, a limit switch 78 is adopted to switch ON when the front side of the cartridge 1 touches thereto. The limit switch 78 is also connected together with each switch element 48, 49 of the switch 47 to a power circuit so that when the cartridge 1 is inserted or taken out of the motor 14 is turned ON or OFF respectively by the limit switch 78.

Figure 3:
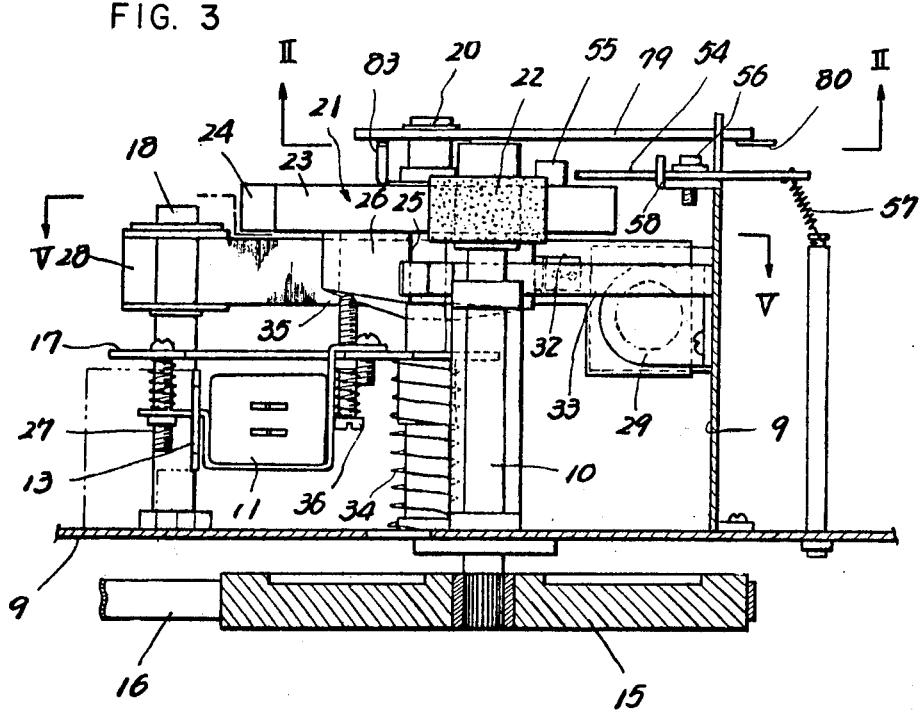
FIG. 3 is a sectional view taken on line I—I of FIG. 2.
Figure 4:
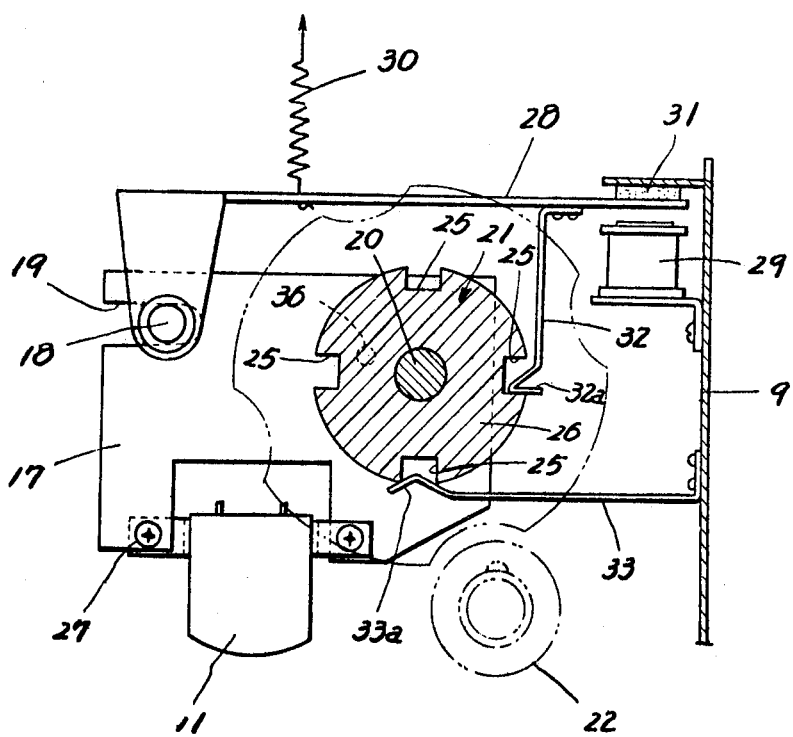
FIG. 4 is a sectional view taken on line II—II of FIG. 3.
Figure 7:
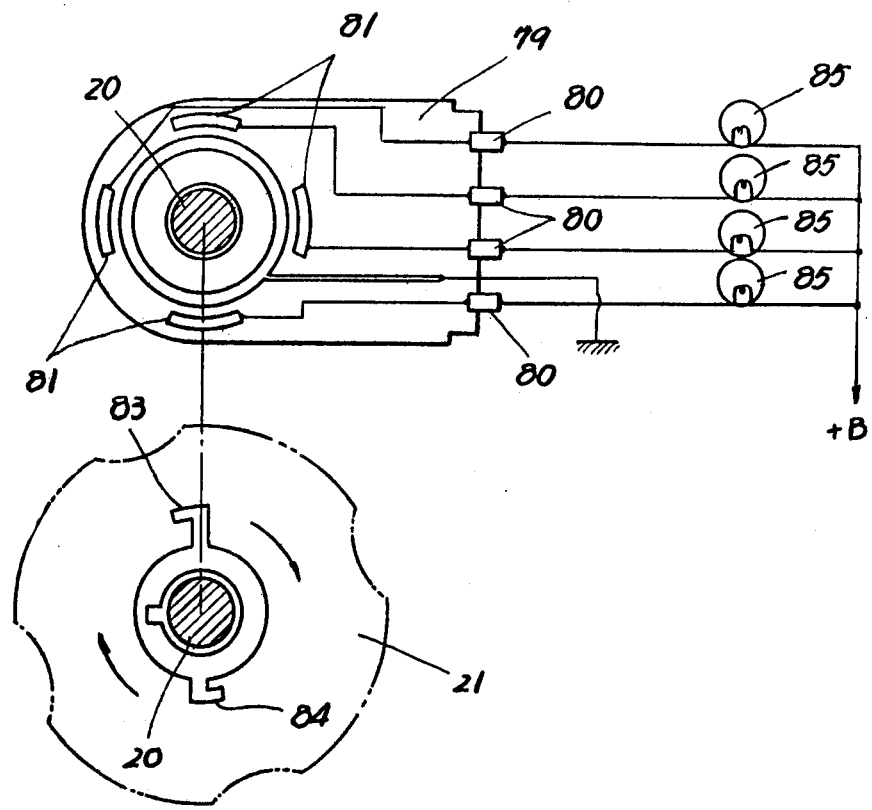
FIG. 7 is a schematic view showing a channel indication circuit.

Referring to FIGS. 3 and 7, a printed wiring plate fixed on the chassis 9 at the one end thereof is provided with 4 terminals 80, and the end portion is connected to the upper portion of the support pole 20 wherein on a circle of which center is the same as that of the pole 20, four selecter contacts 81 for the rotary switches earth contact 82 so as to adjoin a pair of contacts 83, 84 integrated on the surface of the rotary body 21 to each contact 81, 82 respectively, to connect each contact 81 to each terminal 80, to connect the earth contact 82 to the chassis 9 in a short-circuit and further to connect each terminal 80 respectively to four channel indicator lamps 85 which are installed on the front plate 8a of the cabinet 8 thereby switching each lamp 85 through the motion of the rotary body 21 and indicating any position of 4 channels in relation with the head 11. As the above-mentioned capstan shaft 10 can be rotated anit-clockwise or the rotary body 21 rotated clockwise, when the pin 55 moves away from the swing plate 54 as shown in FIG. 2, the height adjustment screw 35 of the base plate 17 on which the magnetic head 11 is mounted fits in the first channel position of the channel switch cam 35 below the rotary 35 wherein as shown in FIG. 4 the extreme end portion 33a of the locating plate 33 fits the notch 25 of the second cam 26 thereby secure the rotary body 21 in the stop position. The press plate 32 of which hook 32a is engaged with the other notch 25 is installed on the absorption 28 which locates apart from the electromagnetic element 29. As shown in FIG. 1, the press plate 32 turns the recording lever 37 through a lever 37a which is extruding from the front panel 8a outwardly, and moves to a position where the adjoining plate 53 of the switch 47 is adjacent to the swing plate 54. Thereafter when the cartridge 1 is placed in the case 5, the side portion of the cartridge 1 turns the lock plate 40 anti-clockwise through the roll 41 and the engagement element 43 fits in the groove 44 of the lever thereby preventing the return of the lever by the spring 46.

Figure 9:
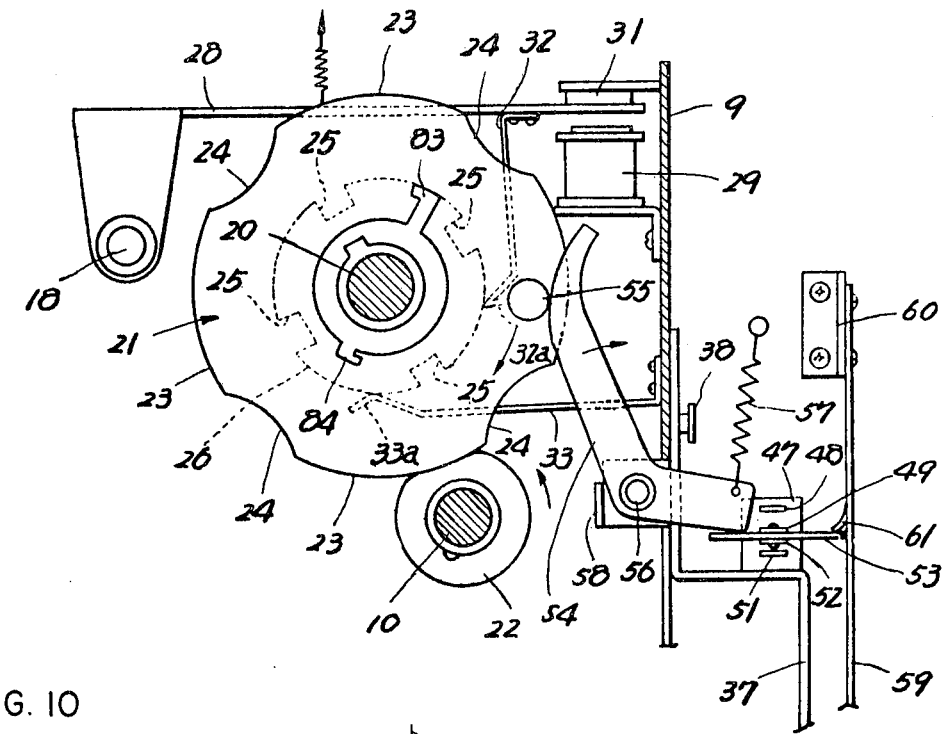
FIG. 9 is also a diagrammatic view illustrating the operation of the mechanism.

The press roll 7 is secured against the V-shaped notch of the cartridge 1 under pressure due to the spring 71, the pinch roll 3 being adjoining to the capstan shaft 10 under a suitable pressure through the tap 2 while the front portion of the cartridge 1 turns the switch 78 ON to start the motor 14 into operation, the capstan shaft 10 rotated at a regular speed through the belt 16 and the fly-wheel 15 whereby the shaft 10 and pinch roll 3 forward the tape 2 at a regular speed and the magnetic head 11 put down a recording signal on the first channel of the tape 2. When the recording on the first channel is accomplished and the conductor tape at the end of the first channel passes through the sensor 12, as shown in FIG. 8, the electromagnetic element 29 is activated to suck the absorption plate thereby swinging the latter and the second cam 26 can be turned slightly clockwise through the press plate 32 which engages with the second cam 26. Then, the corner of the first cam 23 will be pressed into the flexible roll 22 of the capstan shaft 10, torque due to the friction between the first cam 23 and the roll 22 being transmitted to the first cam 23, the roll 22 being rotated under pressure with the first cam 23 as shown in FIG. 9 and the rotary body 21 being rotated. When the channel switch cam 35 mounted below the rotary body 21 rotates, the screw 36 moves to the second channel position of the cam 35, the base plate 17 and the head 11 moving against the pressure due to the spring 34 to the second channel position and the second channel of the tape 2 being recorded. Similar to the above procedure, the third and the fourth channel of the tape 2 can be recorded.

Figure 10:
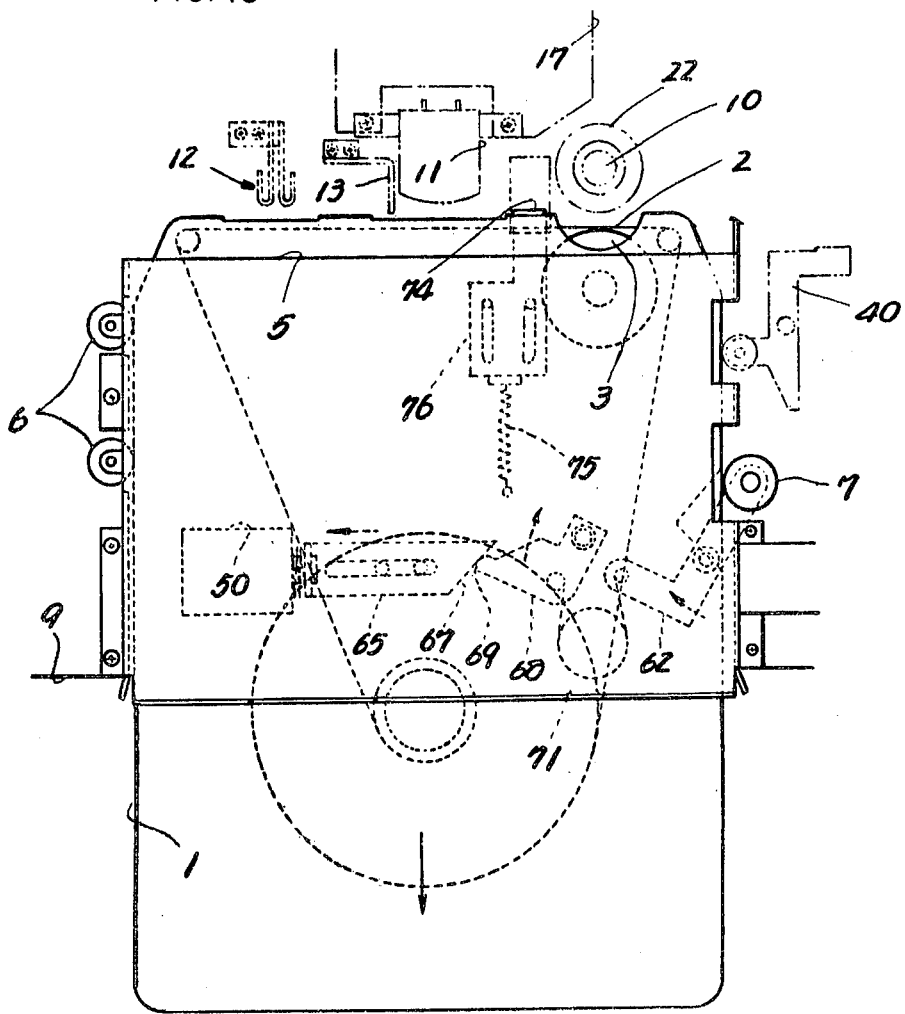
FIG. 10 is a diagrammatic view illustrating the operation for ejecting the cartridge.
Figure 11:
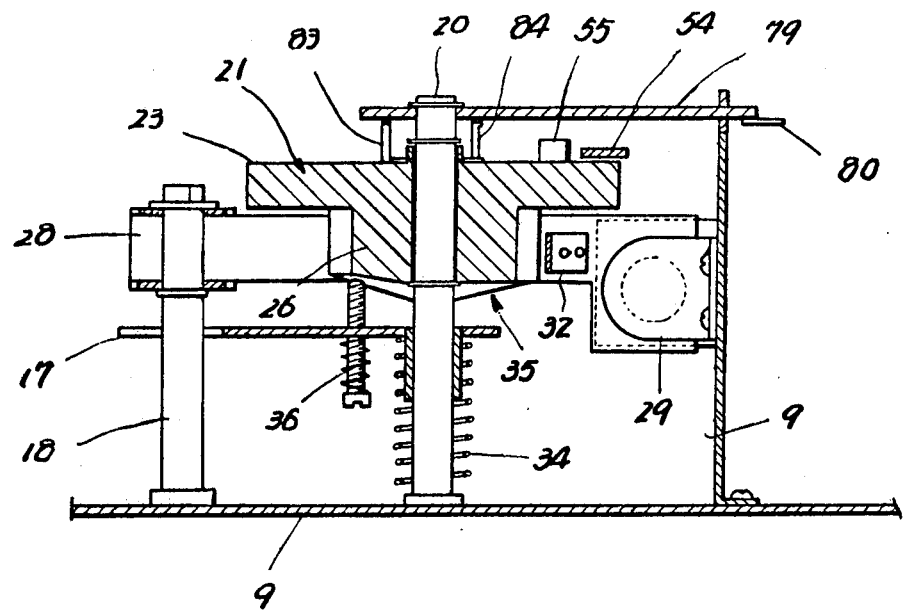
FIG. 11 is a sectional view of the cam portion.

Referring to FIG. 9, when the first cam 23 is rotated under pressure due to the roll 22, the pin 55 on the rotary body 21 touches to the swing plate 54 to turn the latter 54. The other end of the said plate 54 pushes the press plate 53 to turn each switch element 48, 49 or each switch 51, 52 respectively OFF or ON. When the pin 55 passes, the swing plate 54 returns due to the spring 57, the adjoining plate 53, however, is kept in an engagement through the hook 61 of the hook plate 59. Likewise, when the switch elements 48, 49 are turned OFF, the motor will be shut down to stop forwarding the tape 2, the screw 36 returns to the first channel position of the channel switch cam 35 of the rotary body 21 to provide a starting condition, when the switch elements 51, 52 will be turned ON as shown in FIG. 10 the cartridge ejector solenoid 50 will be activated to absorb the slider arm 65, the projected portion 69 of the engagement arm 68 being free from engagement thereby sliding thereof on the tapered surface 67 of the above-mentioned arm 65, the arm 68 being rotated clockwise to drop down the tension of the spring 71 to zero and the pressure onto the cartridge 1 due to the press roll 7 will be cancelled. Further, the ejector plate 76 returns through the spring 75, and the cartridge 1 will be projected outwardly from the case 5.

When the cartridge 1 is taken out from the case 5, the lock plate 40 returns through the spring 45, while the engage element 43 is released from the groove 44 of the lever to keep the hook 59 in a reversed condition from the switch 47 and the recording lever 37 returns due to the spring 46. When the reproduction of the cartridge 1 is required, the cartridge 1, as shown in FIG. 2, is inserted into the case 5, the cartridge 1 being supported under pressure due to the press roll 7 while the front portion of the cartridge 1 turn the switch 78 ON to start the operation of the motor 14 and forward the tape 2 whereby the rotary body 21 is rotated as mentioned above and each channel from 1 to 4 can be reproduced continuously. When the rotary body 21 is rotated in every 90 degree angle as above mentioned, any lamp 85 corresponding to each channel can beput on or off through a pair of contacts 83, 84 and the plug 81, 82 thereby indicating any number channels.

Figure 13:
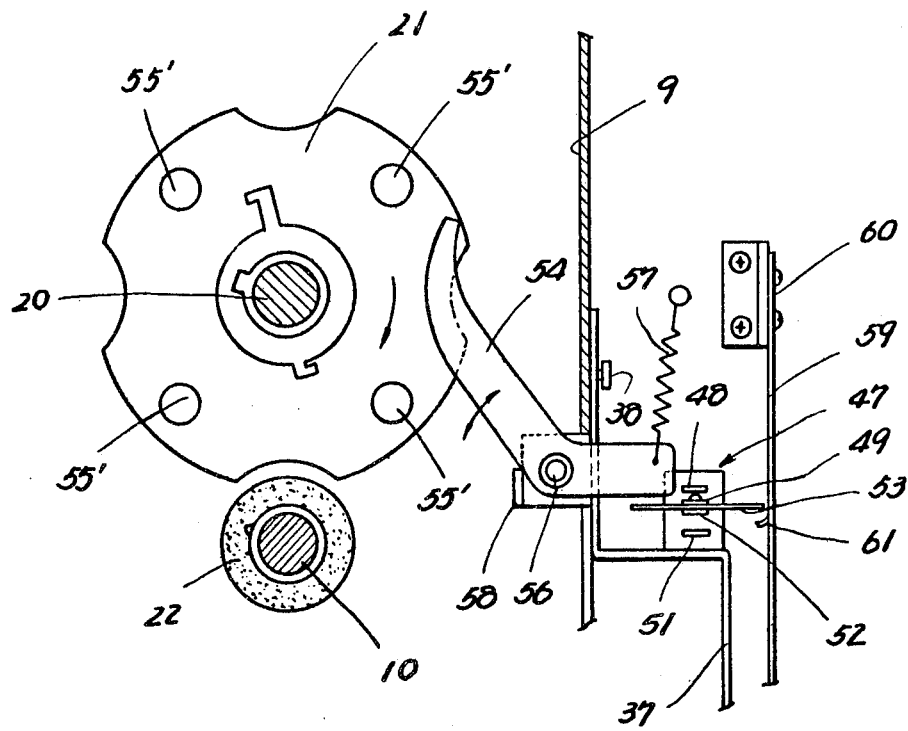
FIG. 13 is a schematic view illustrating another embodiment of the rotary body.

Referring to FIG. 13, the rotary body 21 is provided with the same numbers of pins 55' as that of the channels of the tape 2 wherein at the end of each channel the shut down of the drive or ejection of the cartridge can easily be done.

Figure 14:
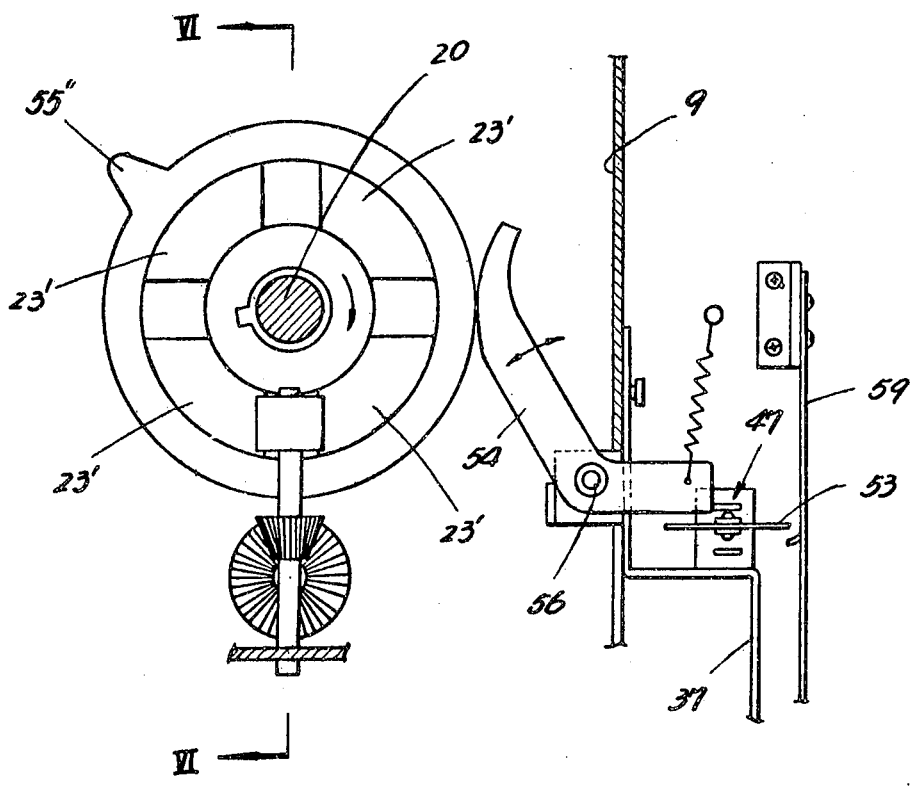
FIG. 14 is a schematic view illustrating another embodiment of the rotary body.
Figure 15:
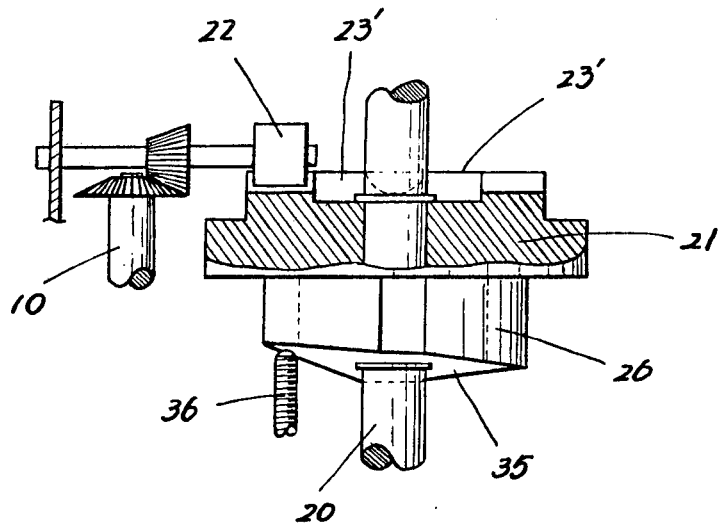
FIG. 15 is a sectional view taken on line VI—VI of FIG. 14.

Referring to FIGS. 14 and 15, the rotary body 21 has the first cam 23' on the upper surface thereof and the piq 55' around the side portion thereof which is adjoining to the swing panel 54. Wherein it is possible to locate the axis of the rotary body 21 in relation to the capstan shaft 10.

Figure 16:
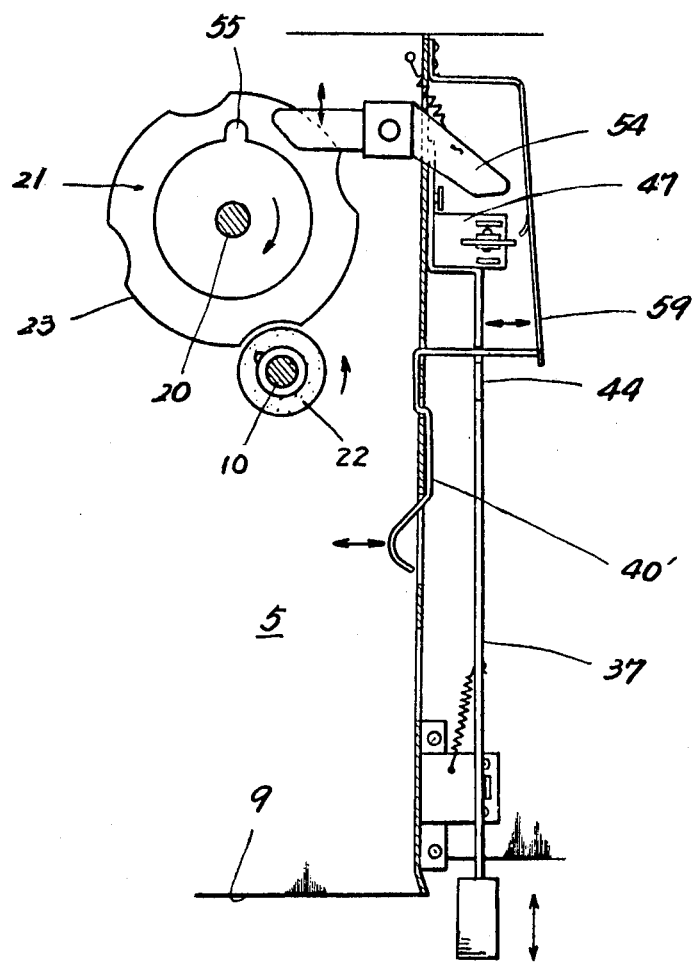
FIG. 16 is a schematic view showing a lock plate in another embodiment.

Referring to FIGS. 16 and 17, the hook plate 40' has one end adjoined to the hook 59, the other end inserted into the case 5 and the middle portion inserted in a zigzag line wherein the lock plage 40' is attached to the chassis 9 thereby making the unit size compact. Referring to FIG. 18, the first switch 100 is turned OFF through the swing plate 54 instead of the switches 48, 49, the second switch 101 connecting power source of the motor to the first switch 100 through the lever 37, and the lock plate 40' securing the swing plate 54 in the operational engagement whereby the motor 14 can automatically shut down by the swing plate 54 with ease.

Figure 19:
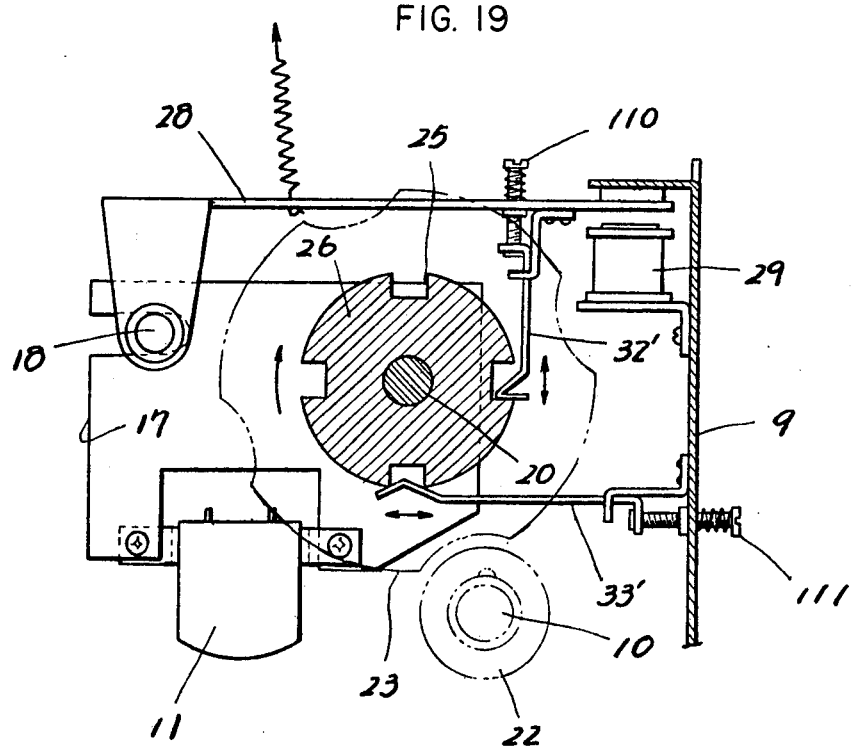
FIG. 19 is a schematic view showing a press plate and a locating plate in another embodiment.

Referring to FIG. 19, the press plate 32' wherein the extreme end portion thereof is engaged with the second cam 26 is mounted slidably on the absorption plate 28, while the press plate adjusting screw 110 mounted on the plate 32' adjusts the plate 32' to a projected length thereof in a direction against the second cam 26. The locating plate 33' for keeping a distance from the second cam 26 is slidably mounted on the chassis 9, while the adjusting screw 111 for and mounted on the locating plate 33' is adopted to control the stop position of first cam 23 of the rotary body 21 through the locating plate 33'. It is, therefore, easy to control mutually the positions of stop and operational engagement between the first cam 23 and the flexible roll 22 through each screw 110 and 111.

Figure 20:
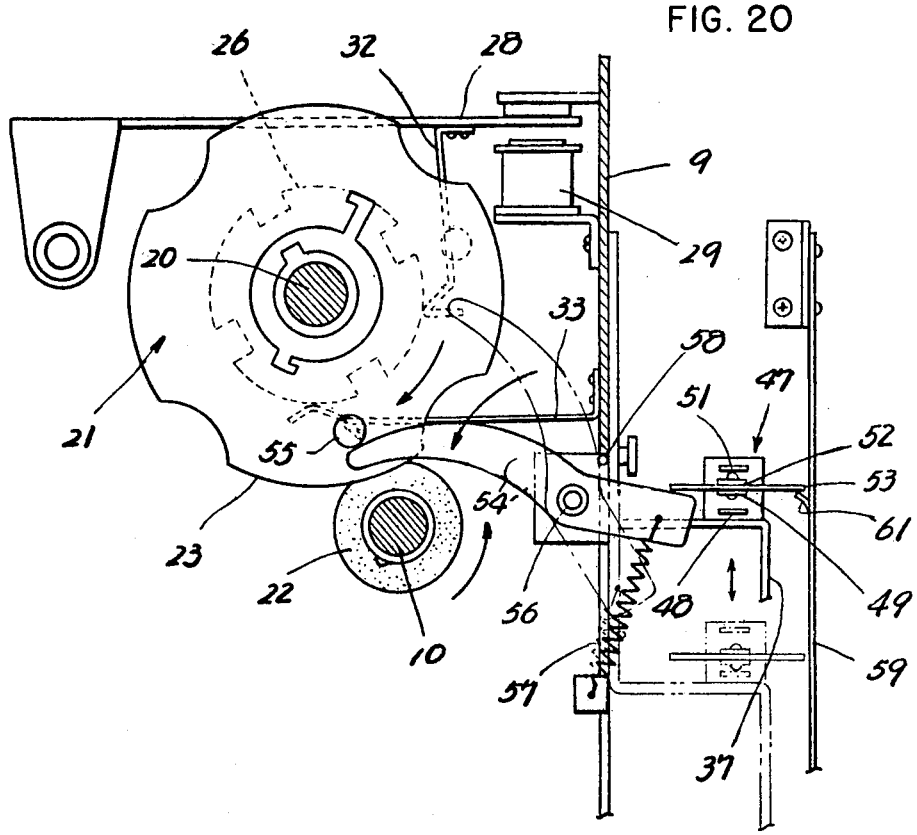
FIG. 20 is a schematic view showing another embodiment of the swing plate.
Figure 21:
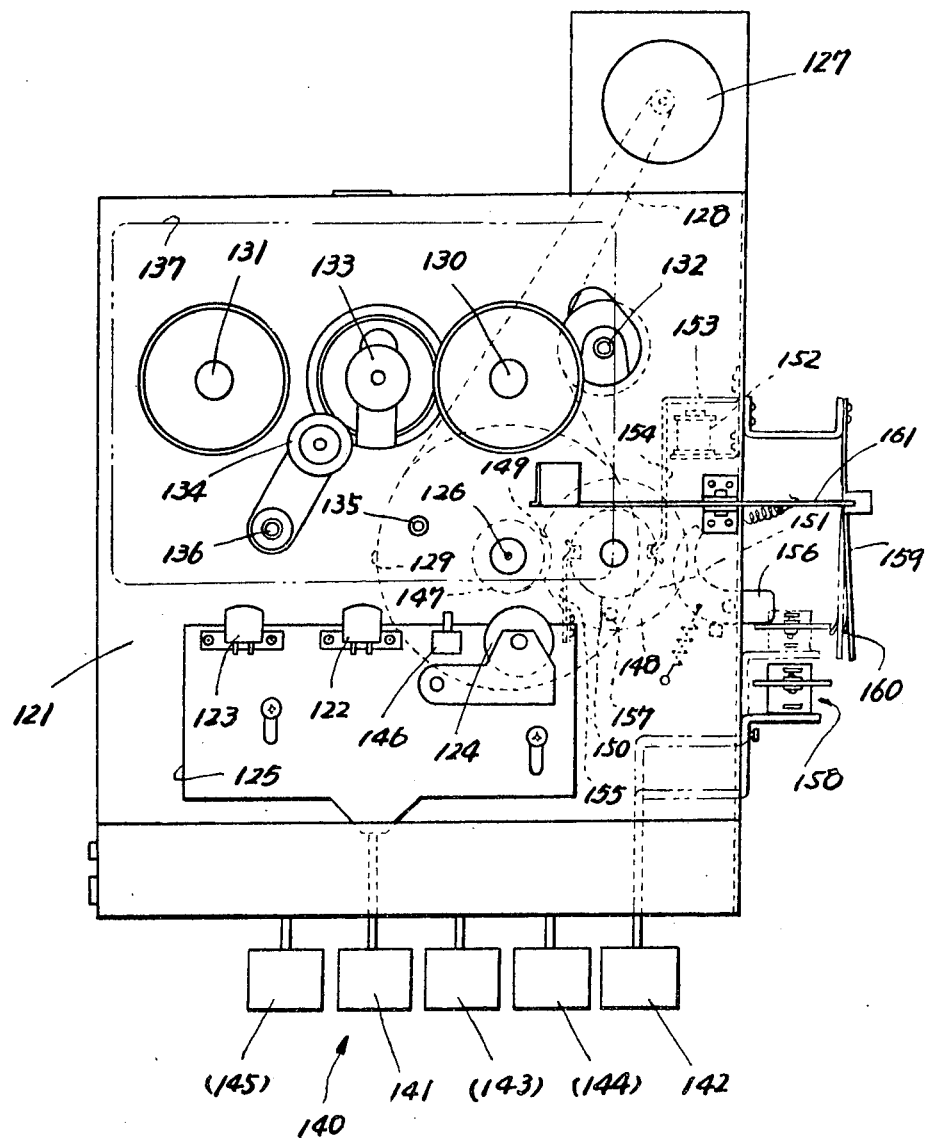
FIG. 21 is a schematic view showing another embodiment of the recording lever.

Referring to FIG. 20, the swing plate 54' is located so that the motion direction of the swing plate 54' through the pin 55 is the same as the rotating direction of the pin 55. The operational direction of the swing plate 54' against the above-mentioned switch 4 can be converted easily from the direction as illustrated in FIG. 9. Referring to FIG. 21, the illustrated tape deck in a top plan view is equipped with the cartridge (cassette) 137 which contains a pair of reel and the non-endless magnetic tape. Designated 121 is a base plate constructing the deck, 122 being a recording-reproduction magnetic head, 123 being a cancell head, 124 being a pinch roll and 125 being a slider plate which is slidably mounted on the base plate 121 distributes and each head 122, 123 and the pinch roll 124 thereon.

Designated 126 is a capstan shaft, 127 being a drive motor which is linked with the capstan shaft 126 through a belt 128 and a fly-wheel 129, 130 being a take-up reel shaft of the cartridge 137. Designated 131 is a feed reel shaft similar to of the take-up shaft 130, 132 being an idle roll for recording and regeneration, 133 being an idle roll for rapid forwarding and 134 being also an idle roll for rewinding. Designated 135 and 136 are locating poles which can be inserted into holes (not shown) of the cartridge 137. A switch mechanism 140 is functionated to control each operation of the tape for recording, regenerating, rapid forwarding and rewinding. A play lever 141 controls the regeneration of the magnetic tape of the cartridge 137 with sliding the plate 125. A recording lever 142 performs a recording operation together with the lever 21. Levers 143, 144 and 145 are adopted to achieve rapid forwarding, rewinding and stopping operations individually by means of a well-known means. Designated 146 is a sensor to detect the end portion of the magnetic tape. A flexible roll 147 is pivoted on the capstan shaft 126. A first cam 148 has a groove 149 for keeping a distance from and adjacent to the roll 147 to co-rotate therewith. A second cam 150 is formed on a rotary body 151 which forms the first cam 148 and pivots on the chassis 121. Designated 152 is an electromagnetic element for electrically connecting with the sensor 146. An absorption plate 153 is swung by the electromagnetic element 152. A press plate 154 has one end fixed on the absorption plate 153 and the other end engaged with the second cam 150. A locating plate 155 keeps an adjacent engagement to and secure in a stop position the rotary body 151. The numeral 156 designates a swing plate which can be rotated by a pin 157 of the rotary body 151. A switch element 158 is mounted on the lever 142 and keeps connection or disconnection with the swing plate 156 through the lever 142 thereby adjoining, when required, to the plate 156 to shut down the motor 127. A hook plate 159 has a hook 160 to keep the switch element 158 in the operational position due to the swing plate 156. A lock plate 161 has one end which is adjoining to a lower portion of the cartridge 137 and the other end which is adjoining to the hook plate 159 thereof connecting or disconnecting the plate 159 to the switch element 158. When the recording of the cartridge 137 is accomplished, the motor can automatically be shut down. As before mentioned according to an embodiment according to the present invention, the channel switch operation of the tape is achieved by co-working of the flexible roll and the rotary body whereby operations of the mechanism are performed instantly and without error wherein out of order of the mechanism can also be reduced. The fact that the construction of the embodiment can be made so small in the size and easy in assembling may resulted from the construction of the rotary body which is so adjacent to the magnetic head. The shut-down of the motor and automatic ejection of the cartridge are controlled by the rotary body whereby accurate operations of each can be achieved and further recording to an endless magnetic tape can also be achieved to each channel thereof.

The construction according to this invention is so simple and compact that it may be comparatively cheap and practically useful to produce it. It is also obvious that the base plate of the magnetic head and the rotary body is pivoted on the same axis to each other through the supporting pole whereby the construction becomes very compact, and that the control members for the above mentioned head, act to magnetic tape and the channel switch members to the magnetic tape are located in the narrow space thereby reducing useless space and resulting in comparatively light in weight and making the cabinet small. it would also be obvious that this embodiment according to the present invention may provide effects of convenience in easy operation and handy carrying.

What is claimed is:

1. A tape recorder comprising a case for accommodating a magnetic tape cartridge in a playable condition, the magnetic tape cartridge having a plurality of channels, a flexible roll linked to a capstan shaft for forwarding the magnetic tape at a uniform speed, and a rotary body having a first cam, a second cam and a channel switch cam, said first cam adjoining the flexible roll to transfer torque of the capstan, said second cam locating the first cam and adjoining the first cam to the flexible roll, the channel switch cam switching adjoining position of a magnetic head to the magnetic tape wherein the torque of the capstan shaft is transferred to the rotary body through the flexible roll thereby achieving channel switch operations of the magnetic head, said first cam being shaped in a circle and being provided with a plurality of hollows of the same numbers as the channels in the magnetic tape, said second cam being provided with a plurality of notches of the same number as the channels in the magnetic tape, said notches being cooperated with a locating plate for stopping and supporting the rotary body at desired channel position, whereby the channel switch cam may be maintained at position corresponding to selected channel position of the magnetic head by stopping the hollow of the first cam at opposite position to the flexible roll.

2. A tape recorder comprising a case for accommodating a magnetic tape cartridge in a playable condition, the magnetic tape cartridge having a plurality of channels, a flexible roll linked to a capstan shaft for forwarding the magnetic tape at a uniform speed, and a rotary body having a first cam, a second cam and a channel switch cam, said first cam adjoining the flexible roll to transfer torque of the capstan, said second cam locating the first cam and adjoining the first cam to the flexible roll, the channel switch cam switching adjoining position of a magnetic head to the magnetic tape wherein the torque of the capstan shaft is transferred to the rotary body through the flexible roll thereby achieving channel switch operations of the magnetic head, an electromagnetic element connected with a sensor which senses each end of channels of the magnetic tape, an absorption plate actuated by the electromagnetic element, and a press plate fixed to the absorption plate at one end thereof and engaged with the second cam of the rotary body at other end thereof, a press plate adjusting screw for adjusting force of the screw against the second cam, a locating plate for stopping and supporting the rotary body at desired channel position, and a locating plate adjusting screw for adjusting the stopped position of the rotary body.

* * * * *